(12) United States Patent
Malina et al.

(10) Patent No.: US 10,248,362 B2
(45) Date of Patent: Apr. 2, 2019

(54) DATA MANAGEMENT FOR A DATA STORAGE DEVICE

(71) Applicant: Western Digital Technologies, Inc., San Jose, CA (US)

(72) Inventors: James N. Malina, Irvine, CA (US); Albert H. Chen, Redmond, WA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/651,560

(22) Filed: Jul. 17, 2017

(65) Prior Publication Data

US 2017/0315756 A1    Nov. 2, 2017

Related U.S. Application Data

(63) Continuation of application No. 13/784,494, filed on Mar. 4, 2013, now Pat. No. 9,720,627.

(60) Provisional application No. 61/753,717, filed on Jan. 17, 2013.

(51) Int. Cl.
    *G06F 3/06*    (2006.01)
(52) U.S. Cl.
    CPC .......... *G06F 3/0674* (2013.01); *G06F 3/0605* (2013.01); *G06F 3/0661* (2013.01); *G06F 3/0664* (2013.01)
(58) Field of Classification Search
    None
    See application file for complete search history.

(56) References Cited

U.S. PATENT DOCUMENTS

| | | | |
|---|---|---|---|
| 6,584,544 B1 * | 6/2003 | Morley | G06F 3/0601 711/114 |
| 7,006,318 B2 | 2/2006 | Stence et al. | |
| 7,146,476 B2 * | 12/2006 | Sandorfi | G06F 11/1448 711/162 |
| 7,254,672 B1 * | 8/2007 | Murray | G06F 3/0607 711/112 |
| 8,208,215 B2 | 6/2012 | Molaro et al. | |
| 8,566,517 B1 * | 10/2013 | Sims | G06F 3/065 360/72.1 |
| 8,756,687 B1 * | 6/2014 | Klein | G06F 21/80 713/194 |

(Continued)

OTHER PUBLICATIONS

"Linear Tape File System (LTFS) Format Specification", LTFS Format Version 2.0.0, Mar. 11, 2011.

(Continued)

*Primary Examiner* — Adam M Queler
*Assistant Examiner* — Alex G Olson
(74) *Attorney, Agent, or Firm* — Barry IP Law, P.C.

(57) ABSTRACT

Managing data stored in at least one Data Storage Device (DSD) includes generating a Linear Tape File System (LTFS) write or read command including an LTFS block address. The generated LTFS command is for writing or reading data in an LTFS data partition, writing or reading metadata in the LTFS data partition, or writing or reading metadata in an LTFS index partition. The LTFS block address is translated to a device address for the at least one DSD using state metadata representing a state of the LTFS data partition and/or a state of the LTFS index partition. The data or the metadata is written or read in the at least one DSD at the device address.

23 Claims, 11 Drawing Sheets

(56) References Cited

U.S. PATENT DOCUMENTS

| | | | |
|---|---|---|---|
| 8,832,365 B1* | 9/2014 | Sims | G06F 3/0686 |
| | | | 711/111 |
| 8,954,663 B1* | 2/2015 | Klein | G06F 3/0619 |
| | | | 711/111 |
| 2005/0114598 A1 | 5/2005 | Hartung et al. | |
| 2006/0109792 A1* | 5/2006 | Broadbent | G06F 11/1076 |
| | | | 370/248 |
| 2007/0136518 A1* | 6/2007 | Slater | G06F 3/0605 |
| | | | 711/111 |
| 2012/0078931 A1 | 3/2012 | Jaquette | |
| 2012/0079184 A1 | 3/2012 | Jaquette | |
| 2012/0079191 A1 | 3/2012 | Jaquette | |
| 2012/0079192 A1 | 3/2012 | Jaquette | |
| 2012/0079223 A1 | 3/2012 | Jaquette | |
| 2012/0179868 A1 | 7/2012 | Haustein et al. | |
| 2012/0210092 A1 | 8/2012 | Feldman | |
| 2012/0323934 A1 | 12/2012 | Amir et al. | |
| 2013/0145085 A1* | 6/2013 | Yu | G06F 12/0246 |
| | | | 711/103 |
| 2013/0159622 A1* | 6/2013 | Cohen | G06F 3/0683 |
| | | | 711/114 |
| 2013/0159656 A1 | 6/2013 | Koarashi | |
| 2013/0271865 A1* | 10/2013 | Amir | G11B 5/00826 |
| | | | 360/15 |
| 2014/0108720 A1 | 4/2014 | Abe et al. | |
| 2014/0108753 A1* | 4/2014 | Benhase | G06F 17/30575 |
| | | | 711/162 |
| 2014/0330817 A1 | 11/2014 | Eleftheriou et al. | |
| 2016/0042760 A1 | 2/2016 | Hasegawa et al. | |

OTHER PUBLICATIONS

Suresh et al., Carnegie Mellon University Parallel Data Lab, "Shingled Magnetic Recording for Big Data Applications", CMU-PDL-12-105, May 2012.

* cited by examiner

DATA MANAGEMENT FOR A DATA STORAGE DEVICE

CROSS-REFERENCE TO RELATED APPLICATIONS

This application is a continuation of U.S. application Ser. No. 13/784,494, filed on Mar. 4, 2013, entitled "DATA MANAGEMENT FOR A DATA STORAGE DEVICE", which claims the benefit of U.S. Provisional Application No. 61/753,717, filed on Jan. 17, 2013. Each of U.S. application Ser. No. 13/784,494 and U.S. Provisional Application No. 61/753,717 is hereby incorporated by reference in its entirety.

BACKGROUND

Tape drives are a type of data storage device that read and write data on magnetic tape, and are often used for archival storage. Until recently, tape drives generally lacked a standardized format for accessing data. The Linear Tape File System (LTFS) format has recently been introduced to provide a standardized file system interface for data stored on magnetic tape. LTFS refers to both the format of data recorded on the magnetic tape and the implementation of specific software that uses the LTFS format to provide a file system interface. Magnetic tape written using the LTFS format can be exchanged between tape drives that use the LTFS format. In addition, software systems that understand the LTFS format can provide users with a file system view of a tape drive.

Despite the advances of LTFS, tape drives require a relatively long time to access data when compared to other types of data storage devices such as disk drives. This is primarily due to the tape drive having to wind magnetic tape between reels to read data a particular location on the magnetic tape. In addition, management of magnetic tape can be time-consuming, such as when loading and unloading the magnetic tape.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment

Figure 1:
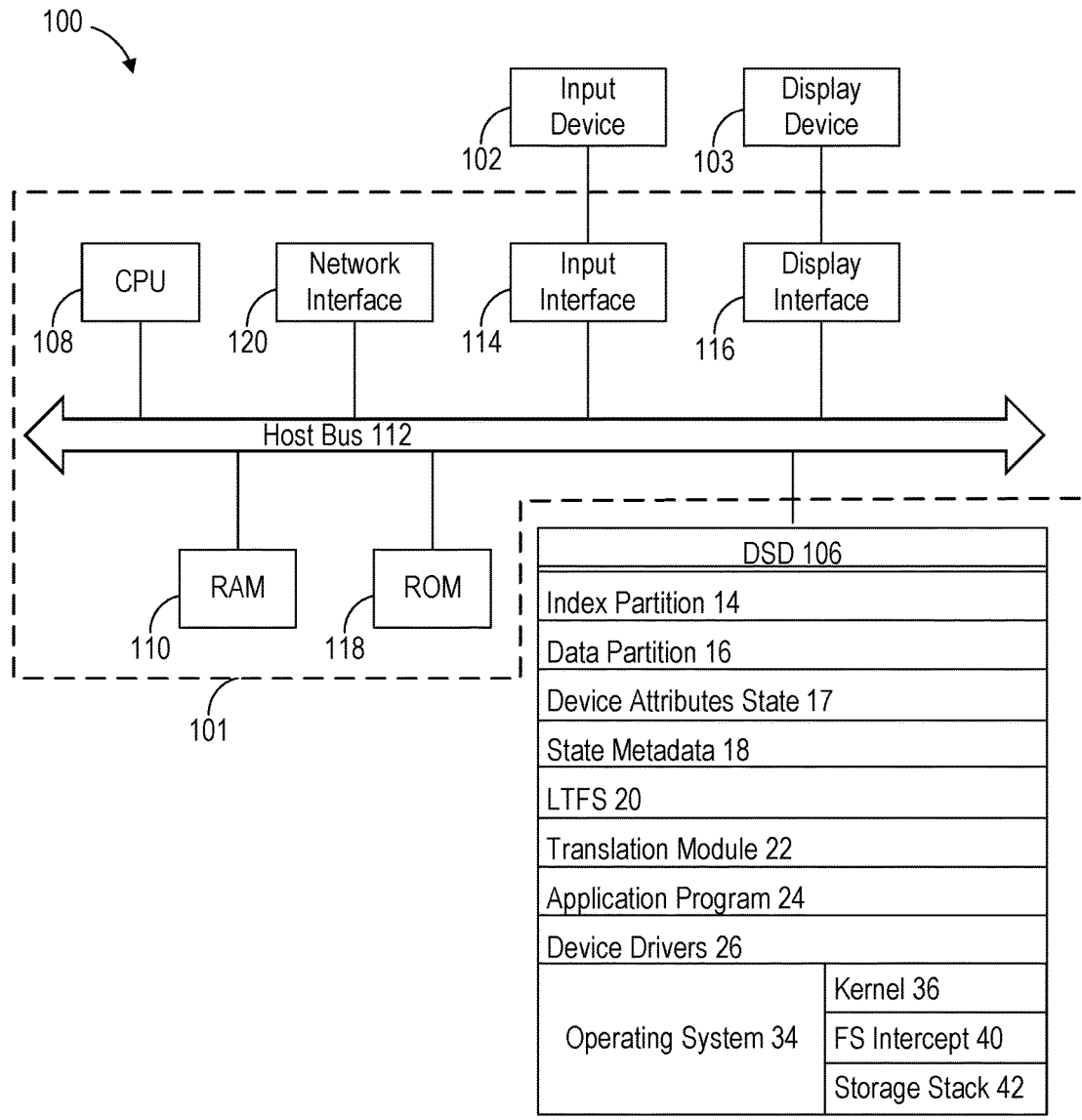
FIG. 1 is a block diagram depicting a computer system including a data storage device according to an embodiment.

FIG. 1 shows computer system 100 which includes host 101, input device 102, display device 103 and data storage device (DSD) 106. Computer system 100 can be, for example, a cloud storage device, personal computer system, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 103. In other embodiments, input device 102 and display device 103 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 103, read only memory (ROM) 118, network interface 120 and DSD 106.

RAM 110 interfaces with host bus 112 so as to provide information stored in RAM 110 to CPU 108 during execution of instructions in software programs such as operating system 34, application program 24, device drivers 26, translation module 22, and linear tape file system (LTFS) 20. More specifically, CPU 108 first loads computer-executable instructions from DSD 106 or another data storage device into a region of RAM 110. CPU 108 can then execute the stored process instructions from RAM 110. Data such as data to be stored in DSD 106 or data retrieved from DSD 106 can be stored in RAM 110 so that the data can be accessed by CPU 108 during execution of software programs to the extent that such software programs have a need to access and/or modify the data.

As shown in FIG. 1, DSD 106 stores application program 24, which can be, for example, a data archiving program or a multimedia program. DSD 106 also includes device drivers 26 for software interfaces to devices such as input device 102, display device 103 and/or DSD 106. In addition, DSD 106 can store operating system 34, which includes kernel 36, file system (FS) intercept 40, and storage stack 42.

As discussed with reference to FIG. 2 below, in one embodiment, DSD 106 is a hybrid drive including both a magnetic disk (i.e., disk 200 in FIG. 2) and a solid state non-volatile memory (NVM) (i.e., NVM 128 in FIG. 2). In another embodiment, DSD 106 is a hard drive with a magnetic disk. Although DSD 106 does not include magnetic tape as a storage media, DSD 106 is configured to use a linear tape file system (LTFS) format with LTFS 20, translation module 22, and FS intercept 40. As discussed in more detail with reference to FIGS. 9 to 11, translation module 22 translates addresses used in LTFS read and write commands to device addresses to allow for data to be written to and read from DSD 106 in accordance with LTFS write and read commands.

As part of the LTFS format, and as discussed below with reference to FIG. 5, the LTFS format includes a data partition and an index partition. In the example of FIG. 1, DSD 106 includes index partition 14 and data partition 16 for storing data and metadata in accordance with the LTFS format. In addition, DSD 106 includes state metadata 18 which represents a state of index partition 14 and data partition 16 for use with translation module 22. DSD 106 also includes device attributes state 17 which is used to represent a state of index partition 14 and data partition 16 with LTFS 20. For example, device attributes state 17 can include a counter which indicates a current volume in accordance with the LTFS format.

Those of ordinary skill in the art will appreciate that the disclosed processes for managing data may be implemented in other environments. In some embodiments, DSD 106 can include more or less than those elements shown in FIG. 1. For example, a DSD may store one or more of operating system 34, application program 24, device drivers 26, translation module 22, and linear tape file system (LTFS) 20, etc., and another DSD may store one or more of index partition 14, data partition 16, device attributes state 17, and state metadata 18, etc. As another example, some embodiments may not include a separate translation module 22 since this module could be implemented as part of device drivers 26.

Data Storage Device Overview

Figure 2:
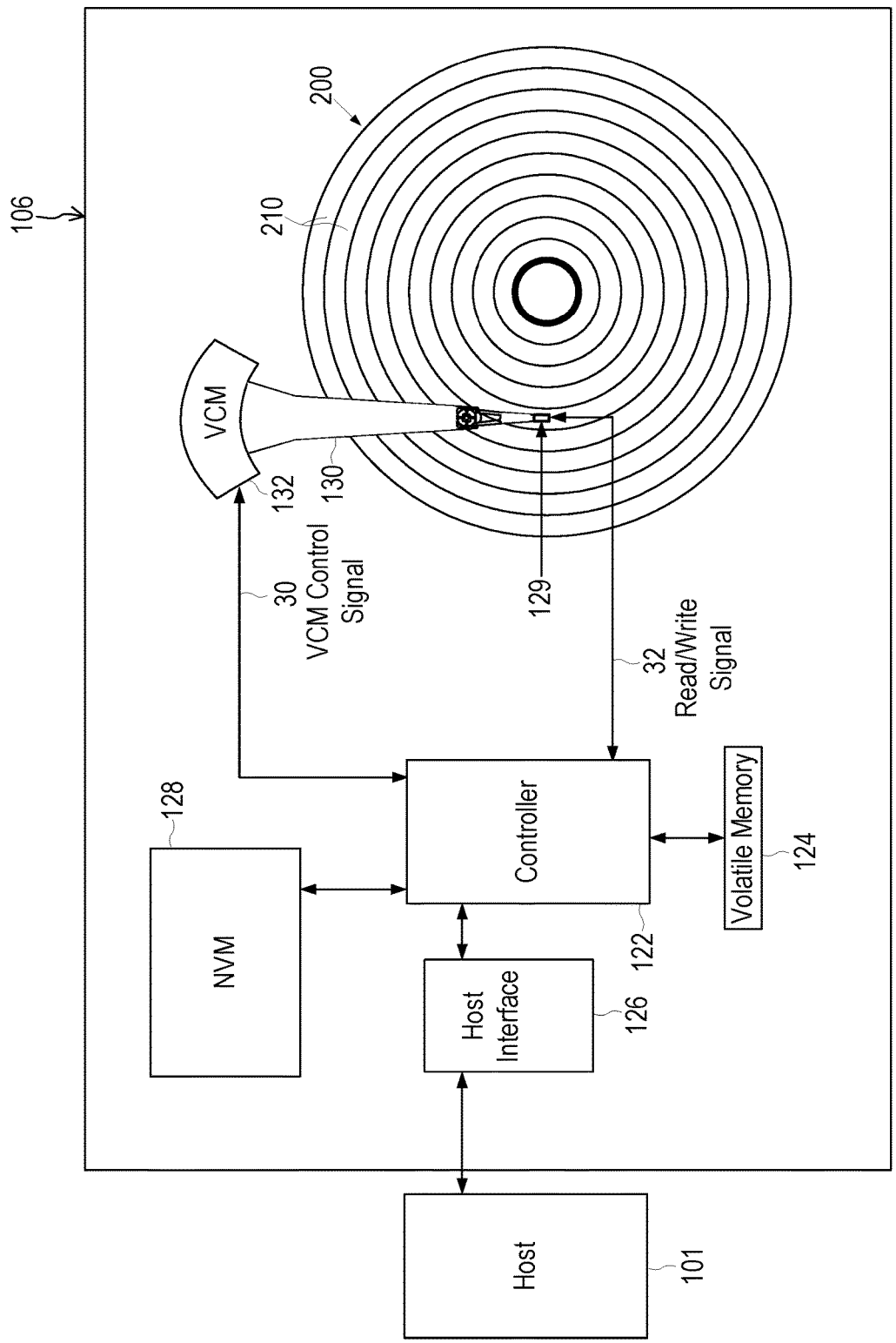
FIG. 2 is a block diagram depicting the data storage device of FIG. 1.

FIG. 2 illustrates a block diagram of DSD 106 according to one example embodiment. As shown in FIG. 2, DSD 106 includes controller 122 which can perform various operations of DSD 106 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 2, DSD 106 includes rotating magnetic disk 200 and head 129 connected to the distal end of actuator arm 130 which is rotated about a pivot by voice coil motor (VCM) 132 to position head 129 over disk 200. Head 129 includes at least a read element (i.e., read element 140 in FIG. 3) for reading data from disk 200, and a write element (i.e., write element 142 in FIG. 3) for writing data on disk 200. Disk 200 comprises a number of radial spaced, concentric tracks 210 for storing data and/or metadata (e.g., index partition 14, data partition 16, device attributes state 17, and/or state metadata 18). Tracks 210 can be grouped together into zones of tracks (e.g., zones 224, 226, and 228 in FIG. 3), with each track 210 divided into a number of sectors (i.e., sectors 222 in FIG. 3) that are spaced circumferentially along tracks 210.

DSD 106 also includes host interface 126 and volatile memory 124, which can include, for example, a DRAM. Data stored in volatile memory 124 can include data read from disk 200, data to be written to disk 200, and/or instructions for controlling DSD 106. Host interface 126 is configured to interface DSD 106 with host 101 and may interface according to the serial advanced technology attachment (SATA) standard or other standards such as serial attached SCSI (SAS). As will be appreciated by those of ordinary skill in the art, host interface 126 can be included as part of controller 122.

In one embodiment, DSD 106 optionally includes solid state non-volatile memory (NVM) 128 for storing data and/or metadata such as index partition 14, data partition 16, device attributes state 17, and/or state metadata 18. While the description herein refers to NVM generally, it is understood that NVM may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. In one embodiment, DSD 106 may include only solid state non-volatile memory (NVM) 128. For example, metadata in index partition 14 may be stored in such a DSD.

In operation, controller 122 writes data to and reads data from disk 200 in response to commands from host 101 received via host interface 126. When controller 122 receives a write command from host 101 with data to be written to disk 200, controller 122 temporarily holds the received data in volatile memory 124. To write data to disk 200, controller 122 positions head 129 over disk 200 by sending VCM control signal 30 to VCM 132. Controller 122 positions head 129 based on position information read from disk 200, and processes data to be written to disk 200 into write signal 32, which is output to head 129. For its part, a write element (i.e., write element 142 in FIG. 3) of head 129 converts write signal 32 into a magnetic field that magnetizes the surface of disk 200 based upon write signal 32, thereby magnetically writing data on disk 200. Controller 122 may notify host 101 via host interface 126 after data for the write command has been successfully written on disk 200.

When controller 122 receives a read command from host 101, requesting data written on disk 200, controller 122 positions head 129 on disk 200 by sending VCM control signal 30 to VCM 132. A read element (i.e., read element 140 in FIG. 3) of head 129 generates read signal 32 based upon the magnetization of the disk surface under head 129, and controller 122 processes read signal 32 into data.

SMR Disk Example

Figure 3:
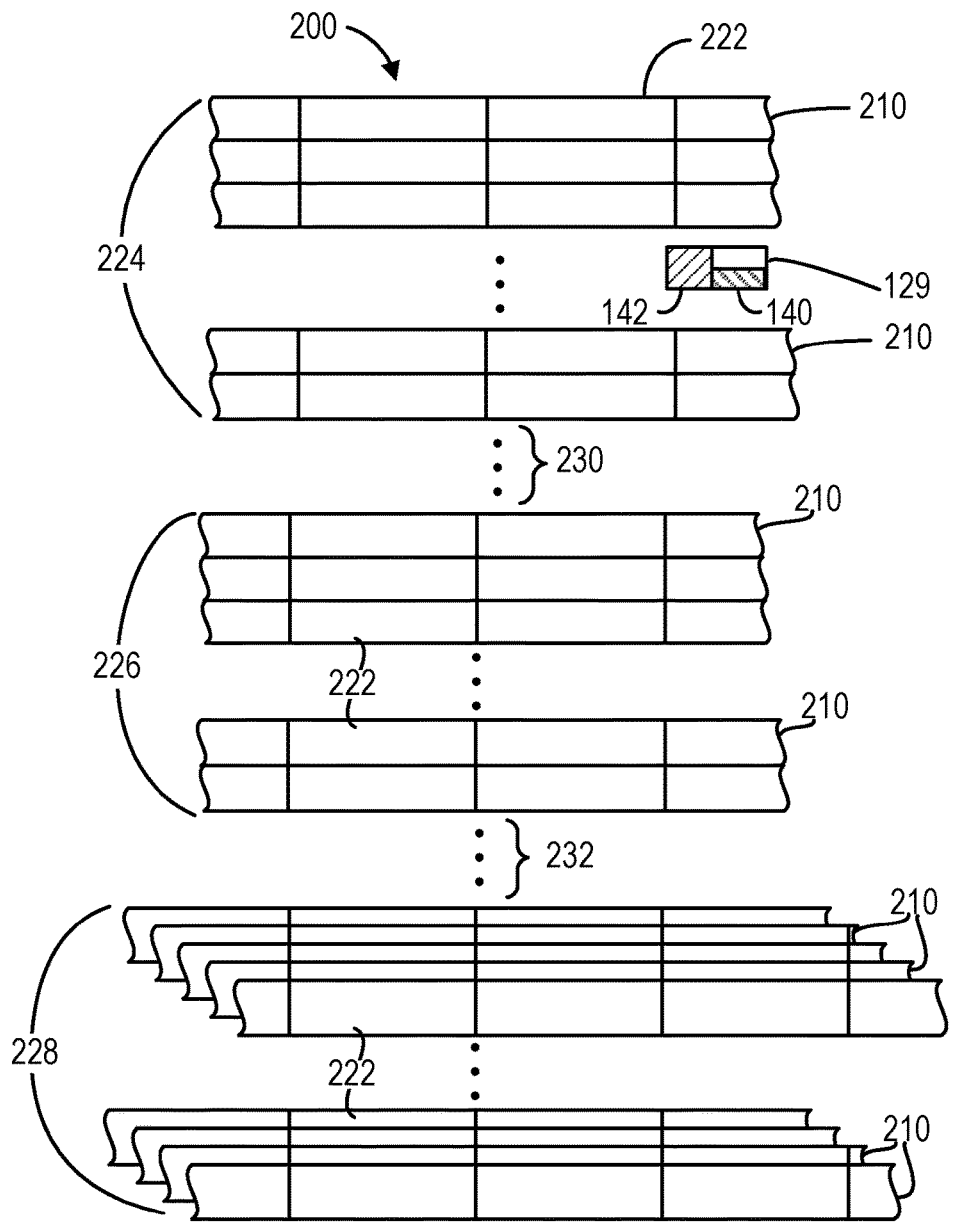
FIG. 3 illustrates a portion of a disk written by a head according to an embodiment.

FIG. 3 illustrates an example configuration in which a portion of disk 200 is shown to include three zones of tracks 210. As depicted in the example of FIG. 3, zones 224 and 226 are zones of non-overlapping tracks 210 written by write element 142 of head 129, and zone 228 is a zone of overlapping tracks 210 also written by write element 142 of head 129. Zones of non-overlapping tracks, such as zones 224 and 226, are referred to herein as conventional magnetic recording (CMR) zones. Zones of overlapping tracks, such as zone 228, are referred to herein as shingled magnetic recording (SMR) zones.

As shown in FIG. 3, each track 210 includes a plurality of sectors 222 for storing a fixed amount of data, such as 2,048 bytes, 1,024 bytes or 4,096 bytes. Head 129 includes read element 140 which generates read signal 32 based upon the magnetization of sectors 222. Head 129 also includes write element 142 which converts write signal 32 into a magnetic field that magnetically writes data in sectors 222. In the example of FIG. 3, write element 142 is substantially wider than read element 140 so as to facilitate shingled magnetic recording in SMR zone 228. In particular, the non-overlapping portions of tracks 210 in SMR zone 228 forms relatively narrow tracks that can be read by read element 140. Accordingly, SMR zone 228 has a higher number of tracks per inch (TPI) than CMR zones 224 and 226. In alternative embodiments, the ratio of the width of the write element to the width of the read element can differ. For example, a write element can be four or five times the width of the read element.

As shown in FIG. 3, CMR zone 224 is separated from CMR zone 226 by gap tracks 230, and SMR zone 228 is separated from CMR zone 226 by gap tracks 232. Gap tracks 230 and 232 are empty tracks, or tracks without data, that serve as buffers between the zones. In the case of SMR zone 228, gap tracks 232 allow for data to be written in SMR zone 228 without overwriting data in a track in adjacent SMR zone 228.

In this regard, SMR zones are generally sequentially written due to their overlapping tracks. Without sequentially writing an SMR zone, new writes to a previously overlapped track would also affect data written in the overlapping track.

As discussed in more detail with reference to FIG. 5 below, the arrangement of disk 200 into different zones can accommodate index partition 14 and data partition 16 in an LTFS format.

Example Partition Arrangement

Figure 4:
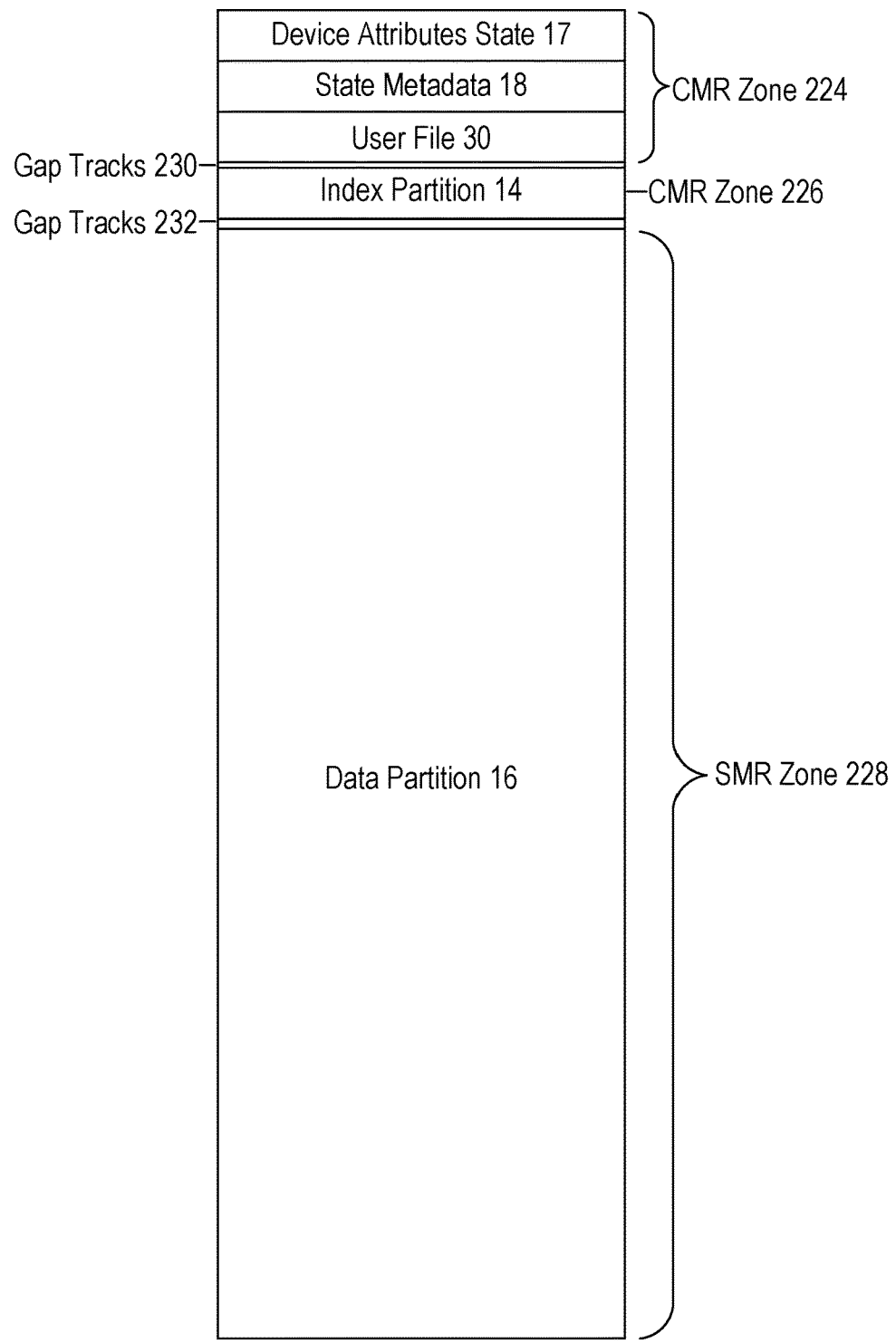
FIG. 4 depicts an arrangement of zones to accommodate an LTFS format according to an embodiment.

FIG. 4 illustrates an example arrangement of the zones of FIG. 3 to accommodate an LTFS format. As shown in FIG. 4, CMR zone 224 stores device attributes state 17 and state metadata 18, CMR zone 226 stores index partition 14, and SMR zone 228 stores data partition 16.

In the example of FIG. 4, the larger data capacity of SMR zone 228 allows for a larger amount of data and metadata to be stored in data partition 16. However, data written in an SMR zone usually cannot be easily modified without affecting adjacent data due to overlapping tracks in an SMR zone. Thus, the data and metadata recorded in SMR zone 228 for data partition 16 are sequentially written and are generally not modified after writing.

Index partition 14 is written in CMR zone 226 to allow for easier modification of the metadata stored in index partition 14. In this regard, the metadata written in index partition 14 can be easily rewritten to indicate deletions of data in data partition 16, for example. In other embodiments, index partition 14 may be stored in a zone of NVM 128 instead of in a CMR zone.

As with index partition 14, state metadata 18 and device attributes state 17 are generally smaller than data partition 16 and include metadata that may be frequently accessed or modified. Accordingly, state metadata 18 and device attributes state 17 are stored in CMR zone 224 in the example of FIG. 4. In other embodiments, state metadata 18 and/or device attributes state 17 may be stored in a zone of NVM 128 instead of in a CMR zone.

While device attributes state 17 can be part of the LTFS format, state metadata 18 is not part of the LTFS format. In the example of FIG. 4, state metadata 18 is used by translation module 22 in translating LTFS block addresses to device addresses for DSD 106. In more detail, state metadata 18 includes metadata representing a state of the data partition and/or a state of the index partition. Such metadata can include LTFS block addresses indicating logical locations of valid or obsolete data for each of data partition 16 and index 14.

In the example of FIG. 4, CMR zone 224 also stores user file 30, which is a copy of a user file stored in data partition 16. As noted above, CMR zone 224 generally offers easier modification of data than SMR zone 228. In addition, CMR zone 224 offers quicker access of data due its smaller size. Accordingly, CMR zone 224 can be used to provide quicker access, better storage utilization, and/or redundancy for particular data stored in data partition 16.

For example, CMR zone 224 can include data which has been recently written to allow for quicker recovery after an unexpected power loss. In another example, files which are less than a predetermined size can be stored in CMR zone 224 rather than being stored in SMR zone 228 to provide for better utilization of SMR zone 228 in terms of file fragmentation. In another example, CMR zone 224 can store data which is frequently modified to allow for easier modification of the data. In yet another example, CMR zone 224 can store data which is frequently accessed to allow such data to be accessed quicker.

Figure 5:
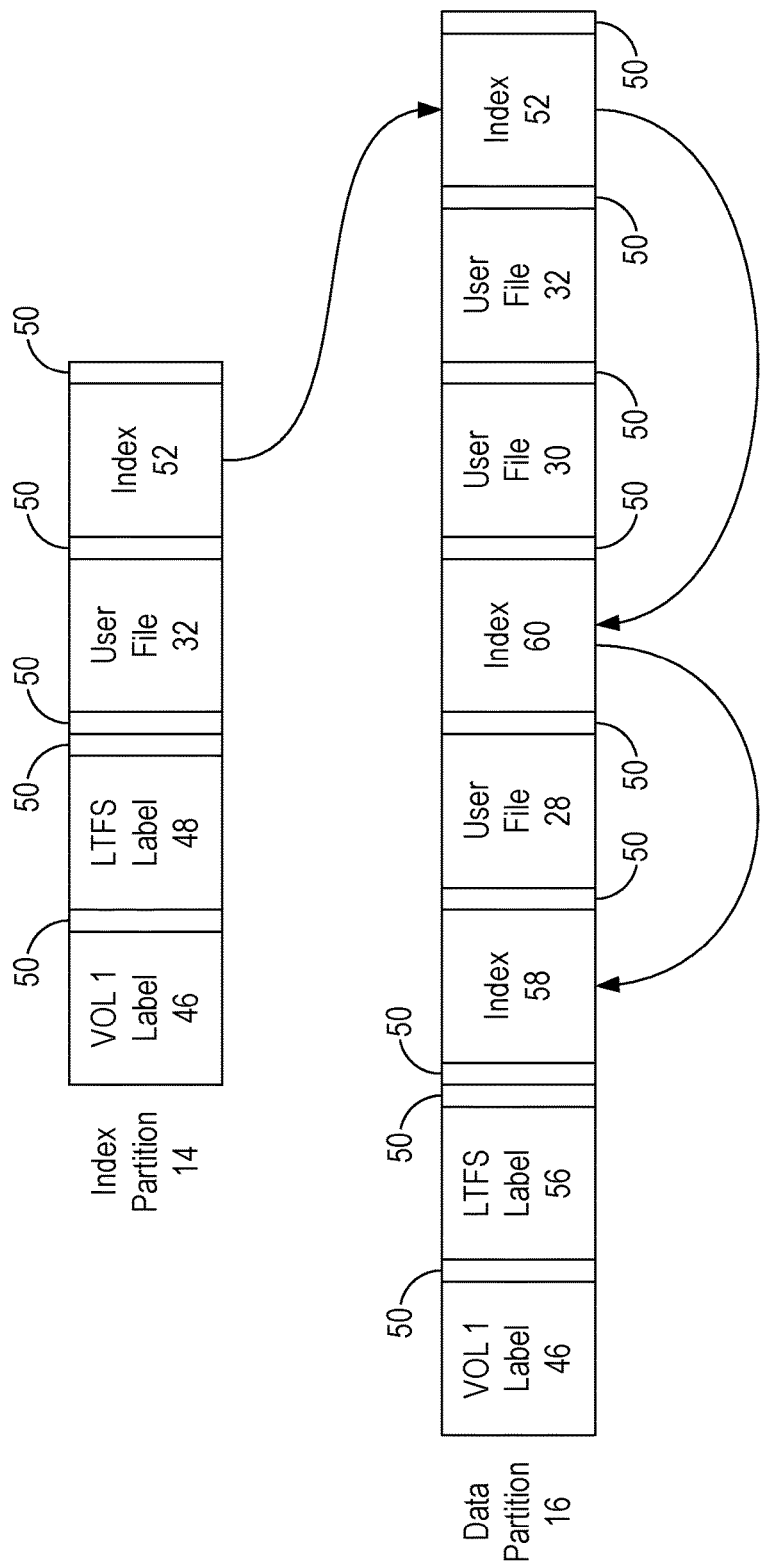
FIG. 5 depicts an example LTFS partition format according to an embodiment.

FIG. 5 depicts an example LTFS partition format for index partition 14 and data partition 16. In a typical tape drive using LTFS, the magnetic tape includes a data partition for primarily storing data files and an index partition for primarily storing metadata associated with the data files. The metadata stored in the index partition is usually the most recent metadata for describing a directory and the file structures stored on the magnetic tape. In the embodiment of FIG. 5, the LTFS metadata includes VOL 1 label 46, LTFS label 48, index 52, index 60, index 58, and LTFS label 56. The data includes user files 32, 30 and 28.

As shown in FIG. 5, each of index partition 14 and data partition 16 begin with a label construct recorded at a first logical block location for each of index partition 14 and data partition 16. For index partition 14, the label construct includes VOL 1 label 46 and LTFS label 48 separated by file mark 50 and ending with another file mark 50. For data partition 16, the label construct includes VOL 1 label 46 and LTFS label 56 separated by file mark 50 and ending with another file mark 50. Both label constructs include the same information with the exception of location information specified in LTFS labels 48 and 56, which provide LTFS block addresses for specific portions of their respective index partition 14 or data partition 16. Each of VOL 1 label 46, LTFS label 48 and LTFS label 56 can be XML documents.

VOL 1 label 46 identifies a volume number for the partitions and can indicate that accessibility is limited to the LTFS standard and can include owner identification information. LTFS labels 48 and 56 can include information on the creator of the volume, the time when the volume was formatted, an identification of the volume, LTFS block addresses for the data and index partitions belonging to the volume, a block size used when writing data to the LTFS volume, and/or a value for compression when writing data.

As shown in FIG. 5, index partition 14 includes index 52, while data partition 16 includes indexes 52, 58 and 60. Each index is buttressed with a file mark 50 and describes all data files, directory information, and associated metadata for files recorded in the volume. In addition, each index can include an LTFS block address which acts as a back pointer to another index. As shown in FIG. 5, index 52 in index partition 14 includes a back pointer to index 52 in data partition 16, which in turn, includes a back pointer to index 60, which includes a back pointer to index 58. In this regard, the LTFS format requires that the indexes in the data partition and the last index in the index partition form an unbroken chain of back pointers. These back pointers can be used to refer back to earlier states of the volume.

As shown in FIG. 5, index partition 14 also includes user file 32 which is recorded in index partition 14 as a backup copy of recently written user file 32 in data partition 16. In this example, index partition 14 can store a most recently written user file from data partition 16 for redundancy. As understood by those of ordinary skill in the art, recording user files in index partition 14 is optional.

Data partition 16 includes user files 28, 30 and 32. As shown in FIG. 5, user files can be interleaved between indexes, as with user file 28 between indexes 58 and 60. User files can also follow in succession with file marks separating the user files, as is the case with user files 30 and 32 separated by file mark 50.

Implementation Environments

Figure 6:
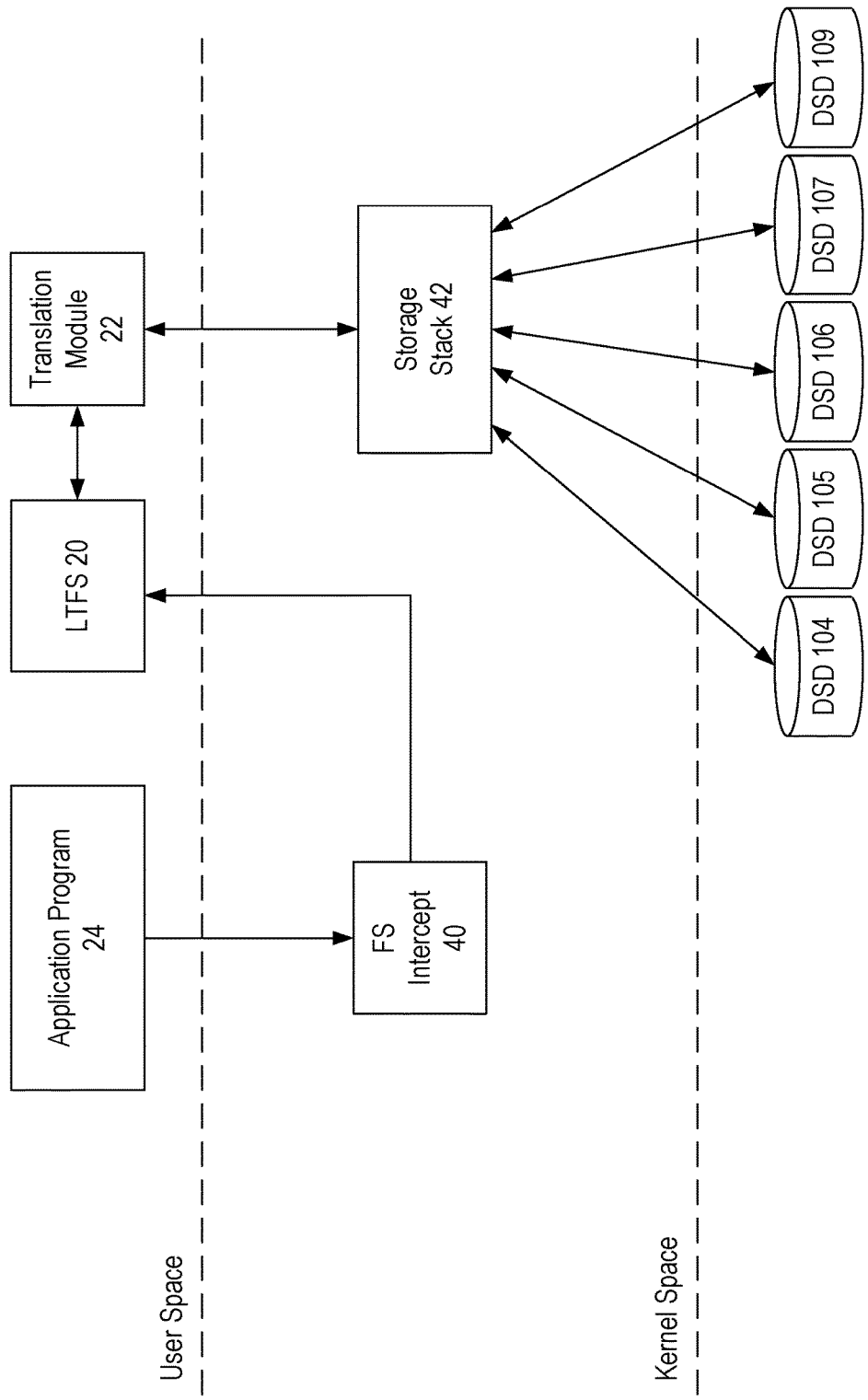
FIG. 6 depicts an example implementation environment including a translation module according to an embodiment.
Figure 7:
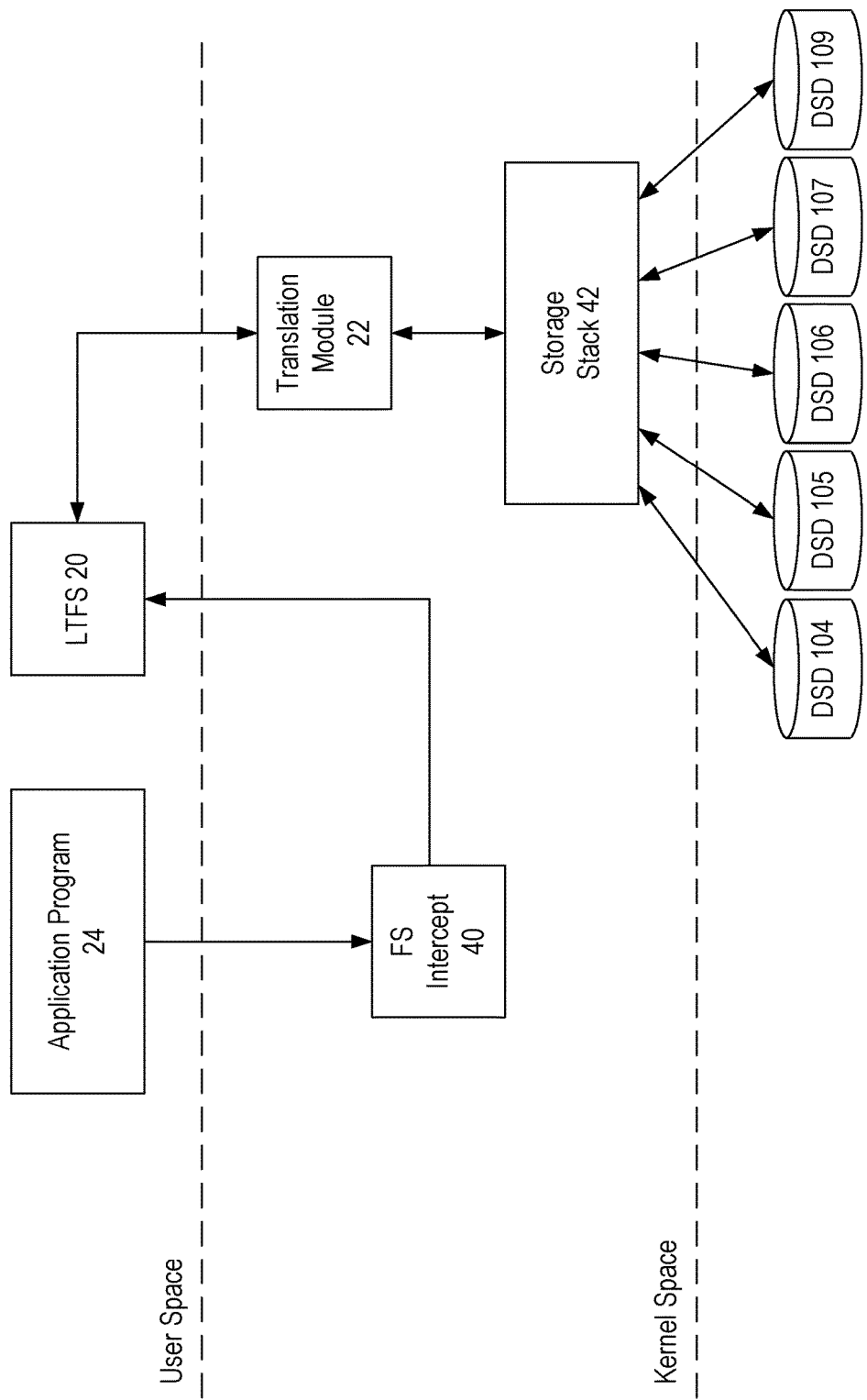
FIG. 7 depicts another example implementation environment including a translation module according to an embodiment.

FIGS. 6 and 7 illustrate two different implementation environments for using LTFS commands with data storage devices that are not tape drives. As shown in FIG. 6, application program 24, LTFS 20 and translation module 22 are implemented in user space while FS intercept 40 and storage stack 42 are implemented in kernel space, which is part of operating system 34. In practice, translation module 22 can be a plug-in driver without requiring modification to LTFS 20.

As indicated by the arrows in FIG. 6, read and write data commands are intercepted by FS intercept 40 and passed to LTFS 20 for generation of an LTFS read or write command. FS intercept 40 can include a virtual file system that intercepts the data access requests from application 24. The LTFS read or write commands generated by LTFS 20 include an LTFS block address indicating a logical location in data partition 16 or index 14 for the metadata or data associated with the LTFS read or write command.

The LTFS read or write command is accepted by translation module 22 which translates the LTFS block address into a device address for a particular data storage device, such as DSD 106. The device address can identify a location in a zone of the data storage device. In the example of DSD 106, the device address can include a logical block address corresponding to a particular sector 222 in a zone on disk 200. In other examples, the device address can include logical block address corresponding to a particular block and page in NVM 128 of DSD 106. As will be appreciated by those of ordinary skill in the art, other types of device addresses are possible without departing from the scope of this disclosure.

Translation module 22 passes the translated device address to storage stack 42 with the respective read or write command for the data storage device. Storage stack 42 can include a module for networking multiple data storage devices such as DSDs 104, 105, 106, 107 and 109 as shown in FIG. 6. In this regard, DSDs 104, 105, 106, 107 and 109 can include different types of data storage devices using CMR media, SMR media, and/or solid state media.

In addition to handling LTFS read and write commands, translation module 22 can also perform file management tasks such as defragmentation of files stored in data partition 16. In this regard, translation module 22 can periodically search for files in data partition 16 which have been spread across data partition 16 due to modifications made to the file at different times. As part of a defragmentation process, translation module 22 can relocate a portion or portions of fragmented files so the file forms a contiguous extent on a disk of a DSD.

FIG. 7 illustrates an example implementation environment that differs from FIG. 6 in that translation module 22 is implemented in kernel space as a part of operating system 34. Implementing translation module 22 in kernel space generally allows for quicker processing when compared to implementing translation module 22 in user space as in FIG. 6. However, the implementation of translation module 22 in user space can advantageously isolate translation module 22 from operating system 34 to prevent problems that may arise during execution of translation module 22 from affecting operating system 34.

Figure 8:
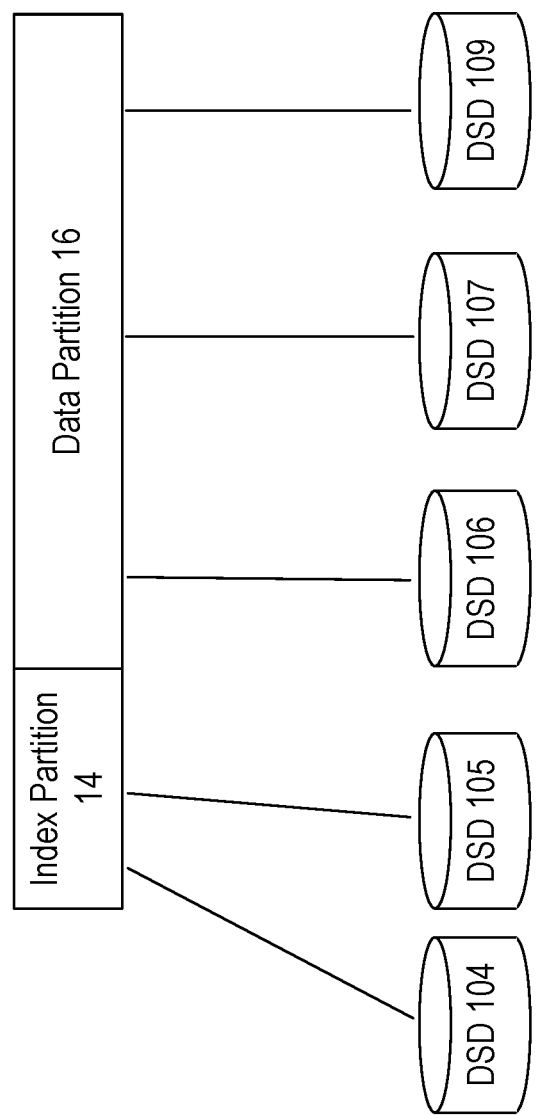
FIG. 8 illustrates the allocation of an index partition and a data partition among multiple data storage devices according to an embodiment.

FIG. 8 illustrates the allocation of index partition 14 and data partition 16 among DSDs 104, 105, 106, 107 and 109 according to an embodiment. In addition to providing for additional storage capacity, writing data partition 16 and/or index partition 14 across multiple DSDs can ordinarily improve performance by allowing for simultaneous reading and/or writing at different DSDs. For example, portions of a large file in data partition 16, such as user file 28, can be spread across DSDs 106, 107 and 109 to allow for quicker reading of the file.

As shown in FIG. 8, data partition 16 is written across DSDs 106, 107 and 109, and index partition 14 is written across DSDs 104 and 105. In the embodiment of FIG. 8, each of DSDs 106, 107 and 109 can include disks such as disk 200 having overlapping tracks to accommodate a large amount of data stored in data partition 16. In addition, each of DSDs 104 and 105 can be dedicated to storing a portion of index 14 to accommodate a large index partition 14. In another embodiment, DSDs 104 and 105 each include a complete copy of index partition 14. Such redundancy can reduce the likelihood of having to reconstruct index partition 14 from data partition 16, which can be a time-intensive task.

As shown above with the example of FIG. 4, index partition 14 can also be stored in a single DSD. In this regard, index partition 14 can be stored in a RAM of a DSD.

In other embodiments, index partition 14 may be stored as a file in a single DSD or as a file distributed across multiple DSDs through a network. Network distribution may enable mirroring/redundancy. For example, an index partition may be stored at several nodes of the network. Mirroring/redundancy can also enable parallelization, so that, for example, data can be concurrently read from two locations storing identical data to increase throughput. Network distribution also allows for decoupling of the physical locations at which the index partition(s) and the data partition(s) are stored. For example, an index partition may be stored in one node of the network while the corresponding data partition may be stored at another node. The ability to store the index partition(s) and data partition(s) in various combinations of nodes throughout the network also enables consolidation for storage efficiency. For example, a central office/data center may host the index and data partitions that are accessible by the satellite offices, or the satellite offices may host the individual data partition(s) and access the index partition(s) located at the central office/data center, or vice versa.

Example Write Processes

Figure 9:
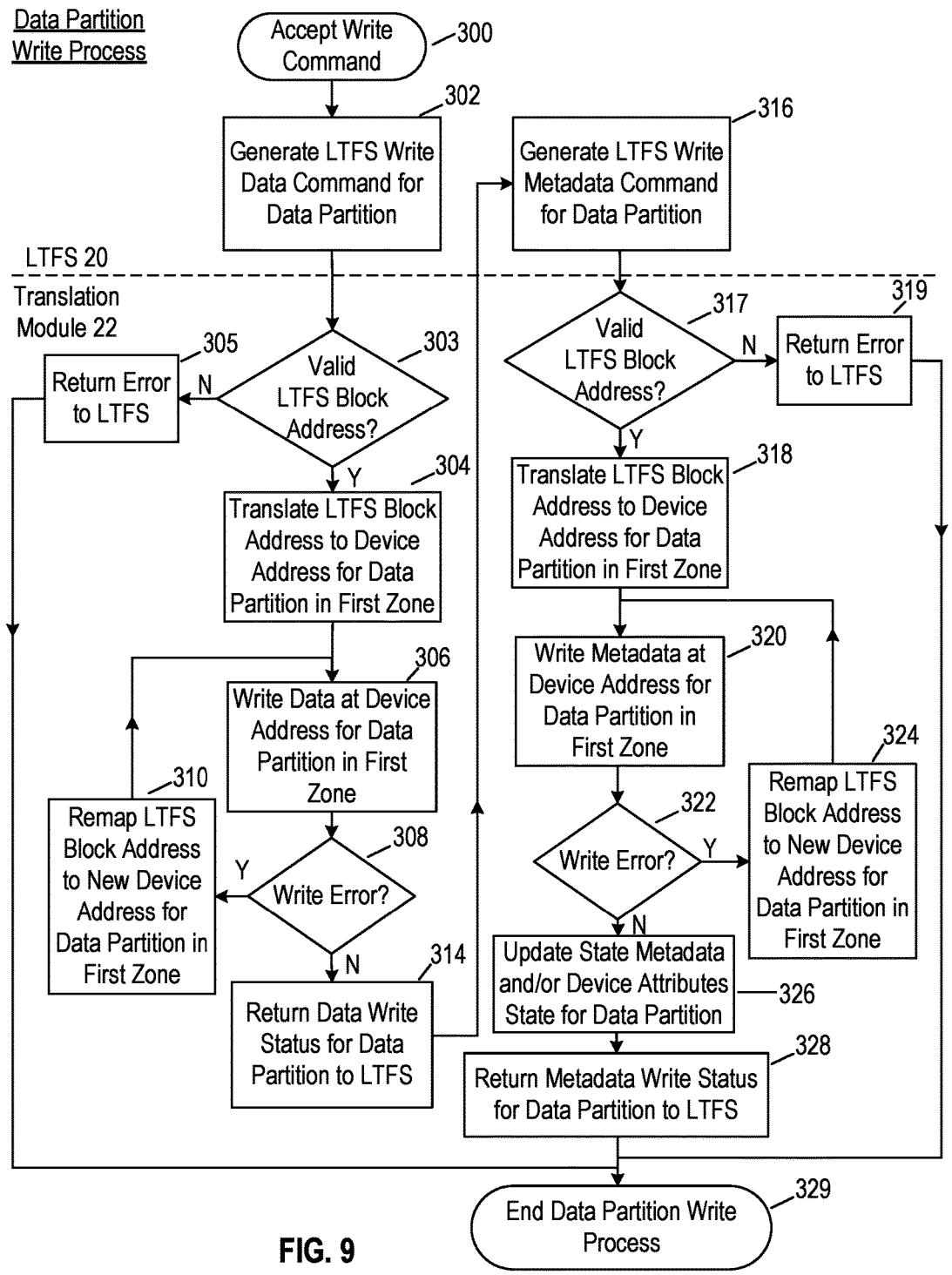
FIG. 9 is a flowchart for a data partition write process according to an embodiment.

FIG. 9 is a flowchart depicting an example write process for data partition 16. As shown in FIG. 9, the blocks above the dashed line are performed by LTFS 20 while the blocks performed below the dashed line are performed by translation module 22.

The process of FIG. 9 begins in block 300 with LTFS 20 accepting a write command from FS intercept 40. The write command may originate from operating system 34 or from an application program such as application program 24 before being intercepted by FS intercept 40.

In block 302, LTFS 20 generates an LTFS write command to write data in data partition 16 in accordance with the accepted write command. The generated write command includes data and an LTFS block address indicating a logical location for writing the data in data partition 16. The data can be, for example, a user file, such as user file 32 in FIG. 5.

In block 303, translation module 22 determines whether the LTFS block address in the write command is a valid LTFS block address. Specifically, translation module 22 can check state metadata 18 to see if the LTFS block address corresponds to an area of data partition 16 which sequentially follows a most recently written LTFS block address of data partition 16. Block 303 can be performed to help ensure sequential writing of data partition 16. If translation module 22 determines in block 303 that the LTFS block address is not valid, translation module 22 returns an error in block 305 to LTFS 20 and the data partition write process ends in block 329.

If it is determined that the LTFS block address is valid in block 303, translation module 22 in block 304 translates the LTFS block address into a device address for data partition 16 in a first zone of at least one DSD. One example of such a first zone can be SMR zone 228 of DSD 106.

In block 306, translation module 22 commands the appropriate data storage device or devices to write the data of the write command at the device address. This could include, for example, storage stack 42 routing the write command and device address to DSD 106 where the write command and device address are received by host interface 126 for processing by controller 122. Based on the device address, controller 122 may write the data in NVM 128 or on disk 200. In the example embodiment of FIG. 4, controller 122 writes the data in SMR zone 228 which stores data partition 16. As part of the writing in block 306, translation module 22 may also perform error correction, encoding of the data with an error correction code, encryption, compression, mirroring, and/or encoding of the data with a forward error correction code (e.g., erasure coding).

In block 308, translation module 22 checks whether any write errors were indicated from the DSD when writing data in block 306. Such a write error can include the device address where writing failed. If a write error is received in block 308, translation module 22 in block 310 remaps the LTFS block address to a new device address for data partition 16 in the first zone. The process then returns to block 306 to command the appropriate data storage device or devices to write the data of the write command.

If no write errors are received in block 308, translation module 22 returns a status indicator in block 314 to LTFS 20 indicating that the data write command for data partition 16 has been completed.

The process of FIG. 9 then continues to block 316 where LTFS 20 generates an LTFS command to write metadata for the data partition in block 316. The metadata can be, for example, an index such as index 52 in FIG. 5 for describing data previously written in block 306. As with the LTFS write command generated in block 302, the LTFS write command generated in block 316 includes an LTFS block address for writing the metadata in data partition 16.

In block 317, translation module 22 determines whether the LTFS block address in the write command is a valid LTFS block address. In more detail, translation module 22 can check state metadata 18 to see if the LTFS block address corresponds to an area of data partition 16 which sequentially follows a most recently written LTFS block address of data partition 16. Block 317 can be performed to help ensure sequential writing of data partition 16. If translation module 22 determines in block 317 that the LTFS block address is not valid, translation module 22 returns an error in block 319 to LTFS 20 and the data partition write process ends in block 329.

If it is determined that the LTFS block address is valid in block 317, translation module 22 in block 318 translates the LTFS block address of the LTFS write command generated in block 316 to a device address for data partition 16 in the first zone of the at least one DSD. In block 320, translation module 22 commands the appropriate data storage device or devices to write the metadata of the write command at the device address. This could include, for example, storage stack 42 routing the write command and device address to DSD 106 where the write command and device address are received by host interface 126 for processing by controller 122. Based on the device address, controller 122 may write the metadata in NVM 128 or on disk 200. In the example of FIG. 4, controller 122 writes the metadata to SMR zone 228 which stores data partition 16.

In block 322, translation module 22 checks whether any write errors were indicated from the at least one DSD when writing metadata in block 320. If so, in block 324, translation module 22 remaps the LTFS block address to a new device address for data partition 16 in the first zone. The process returns to block 320 to command the appropriate data storage device or devices to write the metadata of the write command.

If no write errors are received in block 322, translation module 22 in block 326 updates state metadata 18 and/or device attributes state 17 in a third zone of the at least one DSD to reflect the data written in block 306 and the metadata written in block 320. This may involve updating a directory including LTFS block addresses for data partition 16 in state metadata 18 or changing a volume number in device attributes state 17. As discussed above with reference to FIG. 4, device attributes state 17 and state metadata 18 can be stored in a zone of non-overlapping tracks such as CMR zone 224 to facilitate more frequent modification of metadata stored in device attributes state 17 and state metadata 18. In other embodiments, the third zone can be a portion of a solid state memory such as NVM 128.

In block 328, translation module 22 returns a status indicator to LTFS 20 indicating that the metadata write command for data partition 16 has been completed. The data partition write process of FIG. 9 then ends in block 329.

Figure 10:
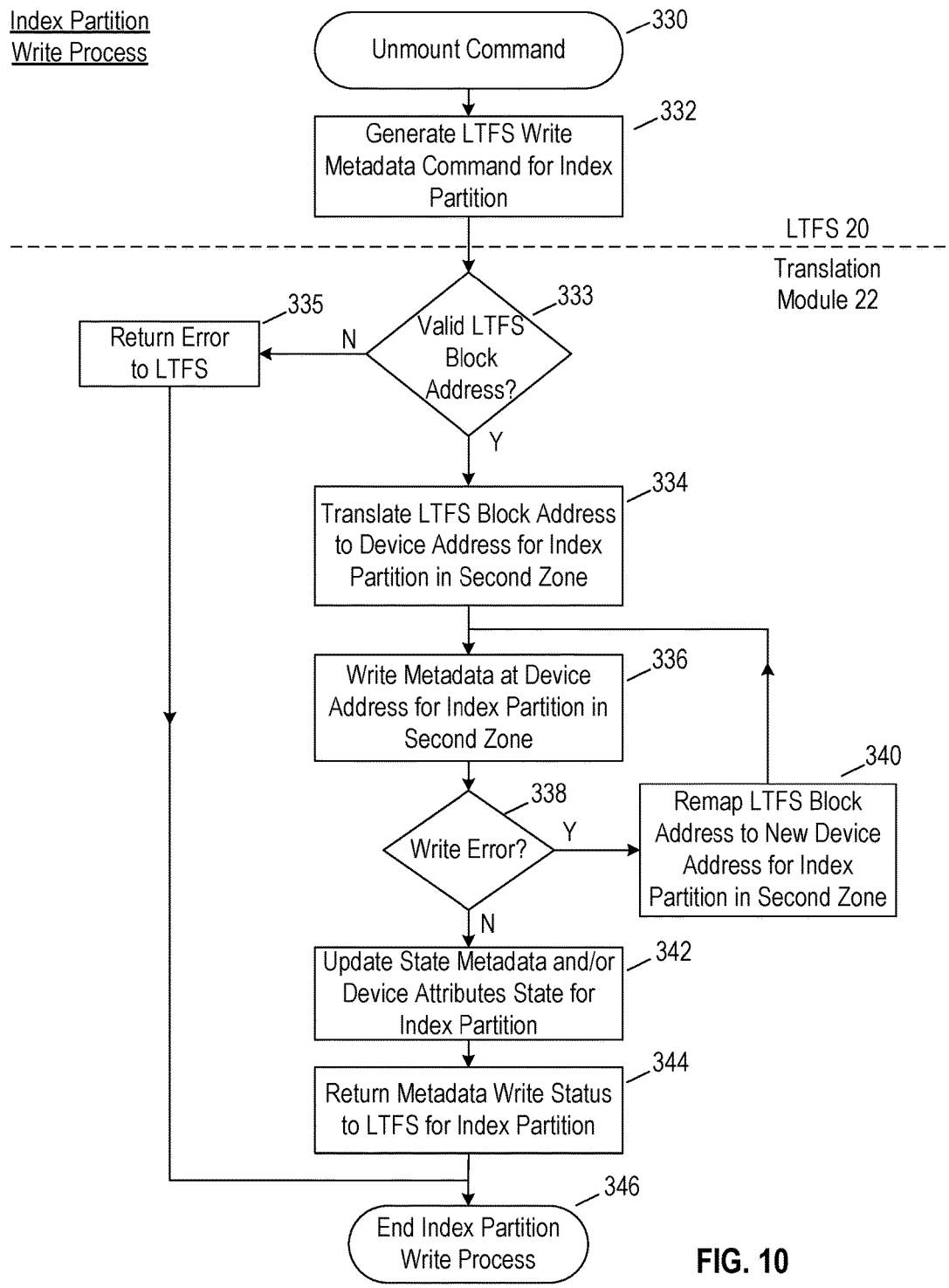
FIG. 10 is a flowchart for an index partition write process according to an embodiment.

FIG. 10 is a flowchart depicting an example write process for index partition 14. As with FIG. 9, the blocks above the dashed line are performed by LTFS 20 while the blocks performed below the dashed line are performed by translation module 22.

The process of FIG. 10 begins in block 330 with LTFS 20 generating an LTFS unmount command which can be generated, for example, in response to the passage of a certain amount of time, a call to synchronize the LTFS file system, or a command to close LTFS 20. In block 332, LTFS 20 generates an LTFS write command to write metadata to index partition 14. Such a write command can be a command to write metadata such as index 52 of index partition 14 in FIG. 5. As with the write commands of FIG. 9, the write command of block 332 includes an LTFS block address indicating a logical location in index partition 14 for writing the metadata.

In block 333, translation module 22 determines whether the LTFS block address in the write command is a valid LTFS block address. Specifically, translation module 22 can check state metadata 18 to see if the LTFS block address corresponds to an area of index partition 14 which sequentially follows a most recently written LTFS block address of index partition 14. If it is determined in block 333 that the LTFS block address is not valid, translation module 22 returns an error to LTFS 20 in block 335. The index partition write process then ends in block 346.

If it is determined in block 333 that the LTFS block address is valid, translation module 22 in block 334 translates the LTFS block address of the write command to a device address in a second zone of the at least one DSD. An example of such a second zone can include CMR zone 226 of DSD 106. In other embodiments, the second zone can be a portion of a solid state memory such as NVM 128.

In block 336, translation module 22 commands the appropriate data storage device or devices to write the metadata of the write command at the translated device address. This could include, for example, storage stack 42 routing the write command and device address to DSD 106 where the write command and device address are received by host interface 126 for processing by controller 122. Based on the device address, controller 122 may write the metadata in NVM 128 or on disk 200. In the example of FIG. 4, controller 122 writes the metadata to CMR zone 226 which stores index 14. Similar to the case when writing data to data partition 16, translation module 22 may also perform one or more additional operations as part of writing metadata to index partition 14. Those additional operations may include error correction, encoding of the metadata with an error correction code, encryption, compression, mirroring, and/or encoding of the metadata with a forward error correction code (e.g., erasure coding).

In block 338, translation module 22 checks whether any write errors were indicated from the at least one DSD when writing metadata in block 336. If so, in block 340, translation module 22 remaps the LTFS block address to a new device address for index partition 14 in the second zone. The process returns to block 336 to command the appropriate data storage device or devices to write the metadata of the LTFS write command in index partition 14.

If no write errors are received in block 338, translation module 22 in block 342 updates state metadata 18 and/or device attributes state 17 in the third zone of the at least one DSD to reflect the metadata written in block 336. This may involve updating a directory including LTFS block addresses for index partition 14 in state metadata 18 or updating a volume number in device attributes state 17. As discussed above with reference to FIG. 4, device attributes state 17 and state metadata 18 can be stored in a zone of non-overlapping tracks such as CMR zone 224 to facilitate more frequent modification of metadata stored in device attributes state 17 and state metadata 18. In other embodiments, the third zone can be a portion of a solid state memory such as NVM 128.

In block 344, translation module 22 returns a status indicator to LTFS 20 indicating that the metadata write command for index partition 14 has been completed. The index partition write process of FIG. 10 then ends in block 346.

Example Read Process

Figure 11:
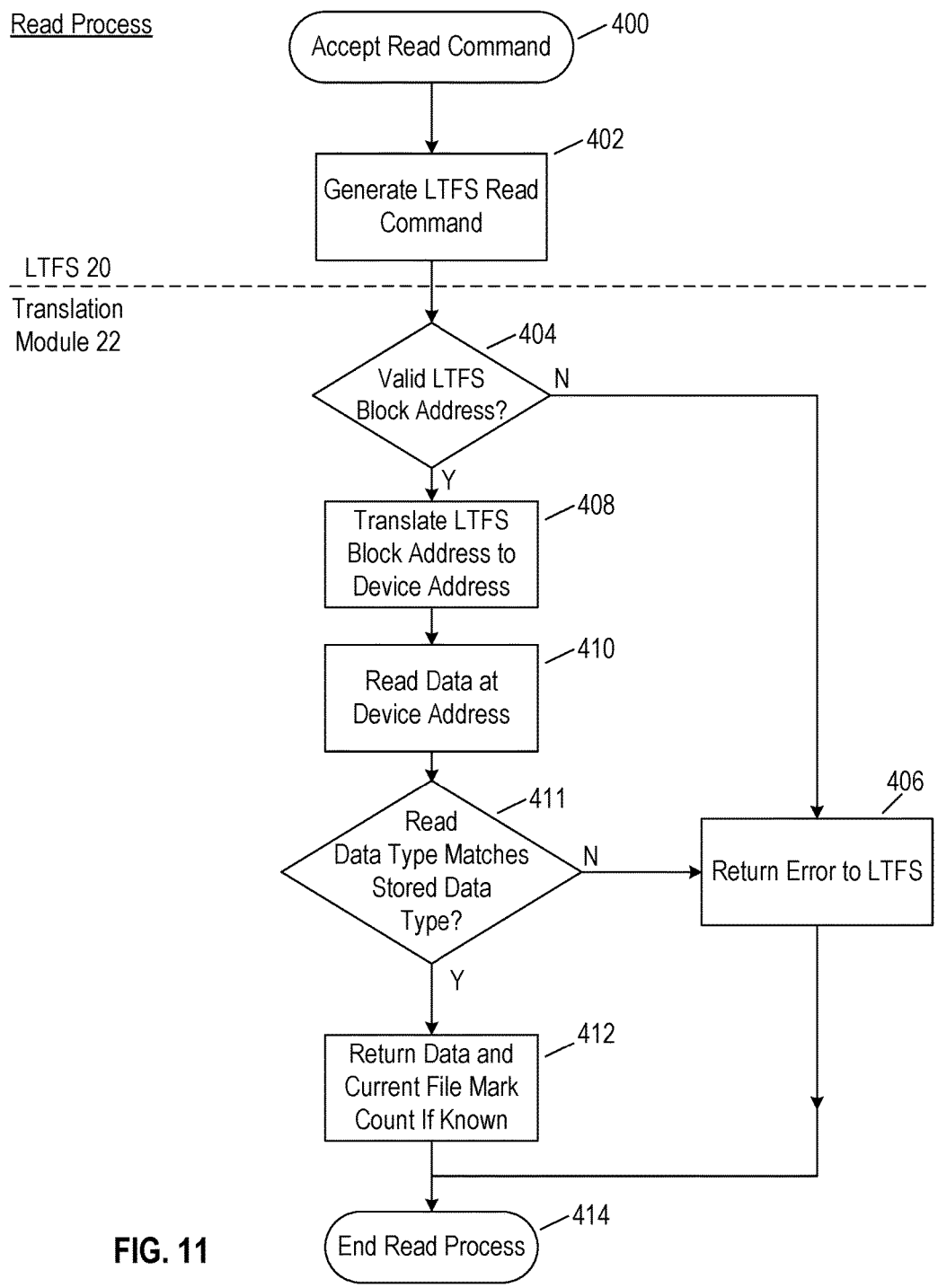
FIG. 11 is a flowchart for a read process according to an embodiment.

FIG. 11 is a flowchart for an example read process for either index partition 14 or data partition 16. The read process of FIG. 11 begins in block 400 where LTFS 20 accepts a read command from FS intercept 40. The read command may originate from operating system 34 or from an application program such as application program 24 before being intercepted by FS intercept 40.

In block 402, LTFS 20 generates an LTFS read command in accordance with the accepted read command. The LTFS read command of block 402 includes an LTFS block address indicating a logical location for reading data or metadata from index partition 14 or data partition 16.

In block 404, translation module 22 determines whether the LTFS block address in the read command is a valid LTFS block address. In more detail, translation module 22 can check state metadata 18 to see if the LTFS block address corresponds to an area of index partition 14 or data partition 16 which has been previously written. This can be facilitated by the sequential writing with respect to LTFS block addresses of index partition 14 and data partition 16. Thus, translation module 22 may determine whether the LTFS block address is valid by checking whether the LTFS block address is less than or equal to a most recently written LTFS block address for index partition 14 or data partition 16.

If it is determined in block 404 that the LTFS block address is not valid, translation module 22 returns an error to LTFS 20 and the read process ends in block 414.

If the LTFS block address is determined to be valid in block 404, translation module 22 in block 408 translates the LTFS block address to a device address for the at least one DSD. In block 410, translation module 22 commands the appropriate data storage device or devices to read the data or metadata at the device address in accordance with the read command. As part of the reading in block 410, translation module 22 may also perform error correction (e.g., using ECC), decryption, decompression, data recovery using mirrored data, and/or data recovery using a forward error correction code (e.g., erasure encoding).

Block 411 is an optional block that can be performed as an extra check that the data read in block 410 is of a correct data type for the device address. In block 411, translation module 22 checks if a data type of the data or metadata read in block 410 matches with a data type stored in state metadata 18 for the device address. In more detail, translation module 22 can check whether data or metadata was read in block 410 and then check state metadata 18 to see if state metadata 18 indicates that data or metadata was written at the device address of the read command. If the data type for the read data or metadata does not match the data type stored for the device address in state metadata 18, the process proceeds to block 406 to return an error to LTFS 20 and the read process ends in block 414.

If translation module 22 determines that the data type matches in block 411, translation module 22 in block 412 returns the data or metadata read to LTFS 20 with a current file mark count, if known. The file mark count can provide LTFS 20 with LTFS location information for the data or metadata read in index partition 14 or data partition 16. If a file mark (e.g., a file mark 50 in FIG. 5) was read in block 410, translation module 22 can return a file mark count from the read file mark. On the other hand, if a file mark was not read in block 410, an immediately preceding file mark may be used to return a file mark count to LTFS 20. After returning the data and file mark count in block 412, the read process of FIG. 11 ends in block 414.

CONCLUSION

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for managing data stored in at least one Data Storage Device (DSD), the method comprising:
   generating a Linear Tape File System (LTFS) write command including an LTFS block address, wherein the generated LTFS write command is for writing data in an LTFS data partition of the LTFS format, writing metadata in the LTFS data partition, or writing metadata in an LTFS index partition of the LTFS format;
   translating the LTFS block address to a device address of a rotating magnetic disk or a solid state non-volatile memory in the at least one DSD using state metadata representing at least one of a state of the LTFS data partition and a state of the LTFS index partition;
   checking the state metadata to determine whether the LTFS block address for the LTFS write command corresponds to an area of the LTFS data partition or the LTFS index partition that sequentially follows a most recently written LTFS block address of the LTFS data partition or the LTFS index partition; and
   in response to determining that the LTFS write command corresponds to an area of the LTFS data partition or the LTFS index partition that sequentially follows a most recently written LTFS block address of the LTFS data partition or the LTFS index partition, writing the data or the metadata in the at least one DSD at the device address for the LTFS write command.

2. The method of claim 1, wherein the at least one DSD includes a zone of non-overlapping tracks on the rotating magnetic disk or a zone in the solid state non-volatile memory for storing the state metadata.

3. The method of claim 1, wherein the state metadata indicates locations of valid or obsolete data in at least one of the LTFS data partition and the LTFS index partition.

4. The method of claim 1, wherein generating the LTFS write command comprises using a virtual file system to intercept a data access request.

5. The method of claim 1, wherein the translation of the LTFS block address to the device address is performed in a user space of a system.

6. The method of claim 1, wherein the translation of the LTFS block address to the device address is performed in a kernel space of an Operating System (OS) of a system.

7. The method of claim 1, wherein at least one of the LTFS data partition and the LTFS index partition is written across a plurality of DSDs of the at least one DSD.

8. The method of claim 1, further comprising checking the state metadata to determine whether an LTFS block address for a LTFS read command corresponds to an area of the LTFS data partition or the LTFS index partition that has been previously written.

9. The method of claim 1, further comprising writing metadata to the LTFS index partition in response to an LTFS unmount command.

10. The method of claim 1, further comprising checking the state metadata to determine if a data type indicating whether data or metadata was read in response to an LTFS read command matches a data type indicated in the state metadata for the device address.

11. The method of claim 1, wherein the LTFS write command is to write data in the LTFS data partition, and wherein the method further comprises:
   determining whether any errors are indicated by the at least one DSD when writing data for the LTFS write command;
   in response to determining that no errors are indicated, indicating to an LTFS that the LTFS write command has completed; and generating, by the LTFS, a second LTFS write command to write metadata in the LTFS data partition in response to the indication that the LTFS write command has completed.

12. A system for managing data, the system comprising:
at least one Data Storage Device (DSD); and
a processor configured to:
generate a Linear Tape File System (LTFS) write command including an LTFS block address, wherein the generated LTFS write command is for writing data in an LTFS data partition of the LTFS format, writing metadata in the LTFS data partition, or writing metadata in an LTFS index partition of the LTFS format;
translate the LTFS block address to a device address of a rotating magnetic disk or a solid state non-volatile memory in the at least one DSD using state metadata representing at least one of a state of the LTFS data partition and a state of the LTFS index partition;
check the state metadata to determine whether the LTFS block address for the LTFS write command corresponds to an area of the LTFS data partition or the LTFS index partition that sequentially follows a most recently written LTFS block address of the LTFS data partition or the LTFS index partition; and
in response to determining that the LTFS write command corresponds to an area of the LTFS data partition or the LTFS index partition that sequentially follows a most recently written LTFS block address of the LTFS data partition or the LTFS index partition, command the at least one DSD to write the data or the metadata in the at least one DSD at the device address for the LTFS write command.

13. The system of claim 12, wherein the at least one DSD includes a zone of non-overlapping tracks on the rotating magnetic disk or a zone in the solid state non-volatile memory for storing the state metadata.

14. The system of claim 12, wherein the state metadata indicates locations of valid or obsolete data in at least one of the LTFS data partition and the LTFS index partition.

15. The system of claim 12, wherein in generating the LTFS write command, the processor is further configured to use a virtual file system to intercept a data access request.

16. The system of claim 12, wherein the processor is further configured to translate the LTFS block address to the device address in a user space of the system.

17. The system of claim 12, wherein the processor is further configured to translate the LTFS block address to the device address in a kernel space of an Operating System (OS) of the system.

18. The system of claim 12, wherein at least one of the LTFS data partition and the LTFS index partition is written across a plurality of DSDs of the at least one DSD.

19. The system of claim 12, wherein the processor is further configured to check the state metadata to determine whether an LTFS block address for a LTFS read command corresponds to an area of the LTFS data partition or the LTFS index partition that has been previously written.

20. The system of claim 12, wherein the processor is further configured to write metadata to the LTFS index partition in response to an LTFS unmount command.

21. The system of claim 12, wherein the processor is further configured to check the state metadata to determine if a data type indicating whether data or metadata was read in response to an LTFS read command matches a data type indicated in the state metadata for the device address.

22. The system of claim 12, wherein the LTFS write command is to write data in the LTFS data partition, and wherein the processor is further configured to:
determine whether any errors are indicated by the at least one DSD when writing data for the LTFS write command;
in response to determining that no errors are indicated, indicating to an LTFS that the LTFS write command has completed; and
generating, by the LTFS, a second LTFS write command to write metadata in the LTFS data partition in response to the indication that the LTFS write command has completed.

23. A non-transitory computer-readable medium storing computer-executable instructions for managing data stored in at least one Data Storage Device (DSD), wherein when the computer-executable instructions are executed by a processor, the computer-executable instructions cause the processor to:
generate a Linear Tape File System (LTFS) write command including an LTFS block address, wherein the generated LTFS write command is for writing data in an LTFS data partition of the LTFS format, writing metadata in the LTFS data partition, or writing metadata in an LTFS index partition of the LTFS format;
translate the LTFS block address to a device address of a rotating magnetic disk or a solid state non-volatile memory in the at least one DSD using state metadata representing at least one of a state of the LTFS data partition and a state of the LTFS index partition;
check the state metadata to determine whether the LTFS block address for the LTFS write command corresponds to an area of the LTFS data partition or the LTFS index partition that sequentially follows a most recently written LTFS block address of the LTFS data partition or the LTFS index partition; and
in response to determining that the LTFS write command corresponds to an area of the LTFS data partition or the LTFS index partition that sequentially follows a most recently written LTFS block address of the LTFS data partition or the LTFS index partition, command the at least one DSD to write data or metadata in the at least one DSD at the device address for the LTFS write command.

* * * * *